(No Model.)
F. E. BROWNE.
APPLIANCE FOR HEATING, ILLUMINATING, OR CULINARY PURPOSES.
No. 498,380. Patented May 30, 1893.
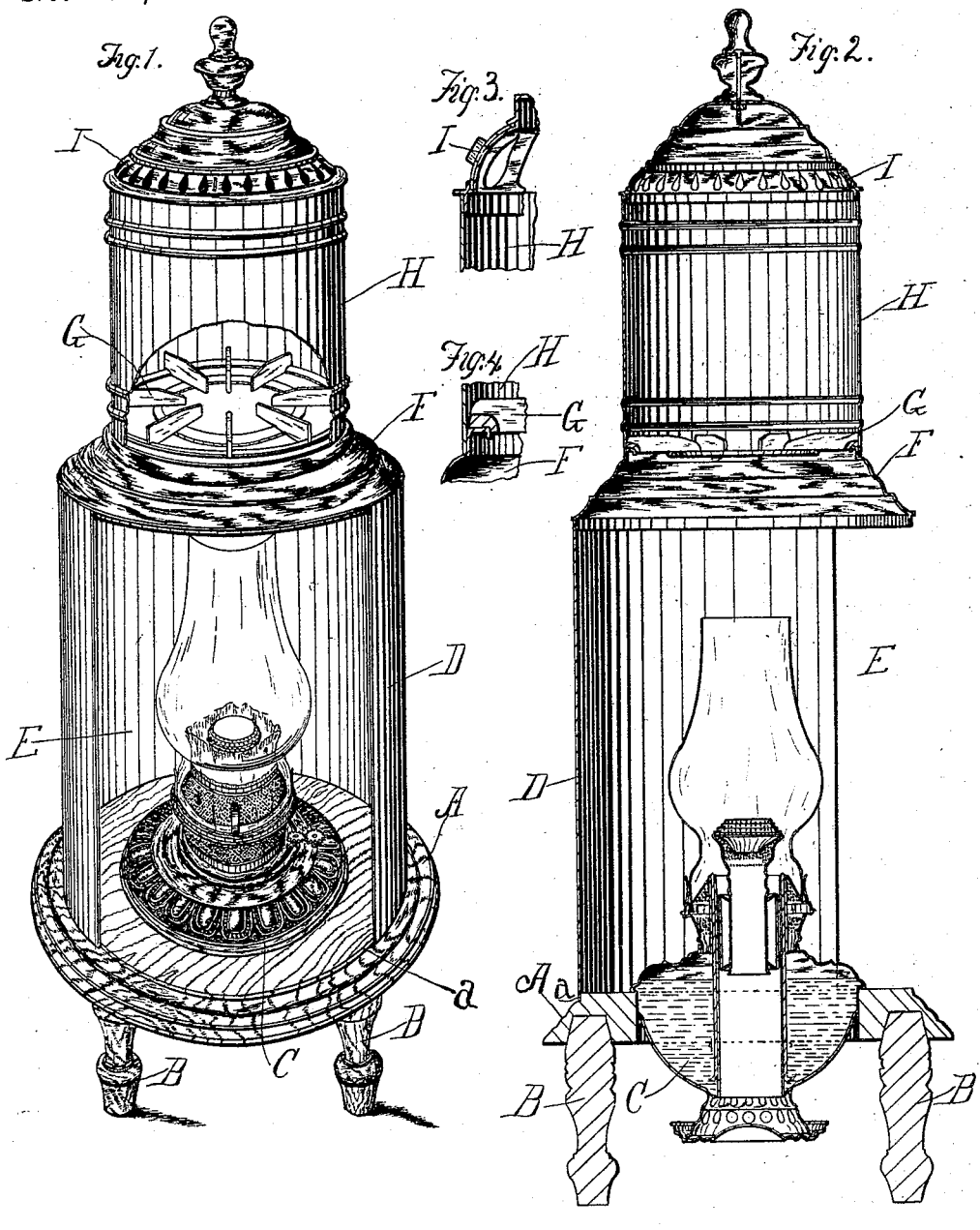

UNITED STATES PATENT OFFICE.

FRANK E. BROWNE, OF LOS ANGELES, CALIFORNIA.

APPLIANCE FOR HEATING, ILLUMINATING, OR CULINARY PURPOSES.

SPECIFICATION forming part of Letters Patent No. 498,380, dated May 30, 1893.

Application filed July 5, 1892. Serial No. 438,863. (No model.)

*To all whom it may concern:*

Be it known that I, FRANK E. BROWNE, a citizen of the United States, residing at Los Angeles, in the county of Los Angeles and State of California, have invented a new and useful Appliance for Heating, Illuminating, or Culinary Purposes, of which the following is a specification.

The object of my invention is to provide an ornamental, economic, convenient, safe, easily portable lamp holding device which will be effective in heating and lighting apartments and which can easily be adapted for cooking purposes as well, the same having superior capacity for heating apartments.

A further object of my invention is to make the heating appliance especially adaptable for heating directly by radiation or, at pleasure for readily heating the air in a room by convection so that it will be effective in heating large rooms by the circulation of the heated air as well as for heating small rooms by direct radiation.

The accompanying drawings illustrate my invention.

Figure 1 is a perspective front view of my invention with a fragment of the removable heat deflector broken away to show the culinary spider. Fig. 2 is a vertical mid section of the same. Fig. 3 is a fragmentary detail of the upper part of the removable heat deflector. Fig. 4 is a fragmentary detail of the upper part of the main heat deflector or lamp receptacle and the lower part of the removable heat deflector and a fragment of the spider. Fig. 5 shows a cross section of a supplementary lamp support arranged to be used in combination with the ring A when the appliance is to be employed for cooking purposes.

My invention pertains to that class of heating appliances in which a lamp is placed within a sheet metal lamp receptacle having an opening at one side to emit the light and heat from the lamp.

My invention embraces in part the combination in a heater of this kind, of an imperforate non-heat conducting base ring mounted upon legs or other suitable supports and arranged to receive within its circle a suitable lamp and having a wall seat arranged at a distance from its inner circle to leave suitable space between the heat deflector wall when in place upon such seat and the lamp when seated within the circle of the ring; a lamp provided with an interior central draft flue; the heat deflecting wall or sheet metal lamp receptacle having the heat emitting side opening; a suitable sheet metal spider supporting breast arranged upon such wall; an open spider mounted upon such breast and a removable heat deflecting and radiating top or drum arranged to fit upon such breast around such spider.

My imperforate non-heat-conducting base ring A is preferably formed of wood or other suitable non-heat-conducting material and the supporting legs B are of sufficient height to hold the base ring far enough above the floor to allow room between it and the floor for the lower portion of the base of a central draft lamp. C indicates such lamp arranged in the seat within the non-heat-conducting base ring A.

D indicates the heat deflecting wall or sheet metal lamp receptacle seated in the wall seat *a*.

E indicates the heat emitting opening therein. No claim is made to the form of such wall or opening.

F indicates the spider sustaining breast.

G indicates the spider arranged upon and supported by such breast, to sustain culinary utensils when it is desired to use the appliance for culinary purposes.

H indicates the removable upper heat deflector and radiating drum fitted upon the breast F exterior to the spider.

I indicates a register in the top of the removable heat deflector and radiating drum whereby the heat can be allowed to pass upward if desired instead of being first deflected downward and then upward as it is ordinarily intended to use the appliance when it is employed as a heater. When it is desired to use the device for culinary purposes the drum is removed.

Heretofore, heating appliances have been constructed with a lamp sustaining base having a lamp seated within a central opening. My invention is to be distinguished from appliances of such character in that the base of such prior appliances have been made of material having high heat conducting qualities and in order to prevent the heating of the oil receptacle of the lamp such bases have been perforated around the lamp seat to admit an upward draft of cold air around the lamp so that the air discharged from the heat emitting opening E has been heated by convection and radiation and there has been an ascending draft of air all about the lamp exterior to the chimney, which draft carried off the heat to the upper part of the room, thus impairing the effective heating qualities of the appliance.

In my heating appliance the draft of air around the lamp chimney is practically done away with and the heated air which passes from the appliance consists simply of that which has been heated with direct contact of the flame in inducing combustion, and nearly the entire amount of heat is by radiation directed outward at right angles from the lamp chimney and the lamp containing heat deflector D instead of ascending to the upper part of the room through the medium of the heated and expanded air which surrounds the lamp chimney and which in said appliance as heretofore constructed rises rapidly and carries the heat to the upper part of the room instead of allowing it to pass outward.

By making the base ring of non-heating and non-heat absorbing material substantially such as wood or other suitable material all danger of heating the oil is avoided. The heat deflecting wall is perpendicular to the base ring so that the heat is directed outward horizontally and not downward upon the base. The upper heat deflector and radiating drum H serves also with great efficiency and economy as a heat radiator, detaining and distributing, by convection, a large portion of the heat which otherwise would pass upward into the upper part of the room and thereby cease to be effective to heat the lower part of the room where the heat is required.

When it is desired to use my appliance for culinary purposes the drum H is removed and the lamp is raised and the supplementary lamp support J is placed in position in the ring and the lamp is set thereon, thus bringing the top of the chimney to the spider.

When it is desired to heat a small apartment by radiation, the register I is closed, thus causing the air to be directed outward below the breast through the front opening E, but if it is desired to heat all portions of a large apartment the register is opened thus increasing the draft through the appliance and inducing a flow of air inward through the opening E in addition to that upward through the lamp thereby heating a greater volume of air, which, rising to the upper part of the room, will eventually pass to the more distant parts thereof.

Now, having described my invention, what I claim as new, and desire to secure by Letters Patent, is—

1. The appliance for heating illuminating and culinary purposes consisting of the combination of the imperforate non-heat-conducting base ring mounted upon suitable supports and arranged to receive within its circle a suitable lamp and having a wall seat arranged at a distance from its inner circle to leave suitable space between the heat deflector wall when in place upon such seat and a lamp when seated in such seat; a lamp provided with an interior central draft flue; the heat deflector wall having a heat emitting side opening; a suitable spider supporting breast arranged upon such wall; an open spider mounted upon such breast and a removable heat deflecting drum arranged to fit upon such breast around such spider.

2. The appliance set forth consisting of the combination of an imperforate non-heat-conducting base ring mounted upon suitable supports and arranged to receive within its circle a suitable lamp; a lamp provided with an interior central draft flue; the heat deflector wall having a heat emitting opening; the heat deflecting drum mounted upon such wall and a register arranged in the top of the drum.

F. E. BROWNE.

Witnesses:
JAMES R. TOWNSEND,
ALFRED I. TOWNSEND.